United States Patent [19]
Pike et al.

[11] Patent Number: 5,924,110
[45] Date of Patent: Jul. 13, 1999

[54] MULTISCHEME MEMORY MANAGEMENT SYSTEM FOR COMPUTER

[75] Inventors: Jimmy D. Pike, Lexington; James L. Browning, Columbia, both of S.C.

[73] Assignee: NCR Corporation, Dayton, Ohio

[21] Appl. No.: 08/772,063

[22] Filed: Dec. 6, 1996

[51] Int. Cl.[6] .................................................. G06F 12/06
[52] U.S. Cl. .............................. 711/2; 711/202; 711/173
[58] Field of Search .................................. 711/2, 5, 154, 711/170, 173, 202

[56] References Cited

U.S. PATENT DOCUMENTS

| | | | |
|---|---|---|---|
| 4,685,125 | 8/1987 | Zave | 379/96 |
| 4,825,358 | 4/1989 | Letwin | 395/651 |
| 4,891,752 | 1/1990 | Fairman | 395/823 |
| 4,926,322 | 5/1990 | Stimac | 395/500 |
| 4,985,871 | 1/1991 | Catlin | 365/230.06 |
| 5,103,394 | 4/1992 | Blasciak | 395/575 |
| 5,161,218 | 11/1992 | Catlin | 711/2 |
| 5,182,805 | 1/1993 | Campbell | 395/650 |
| 5,303,378 | 4/1994 | Cohen | 395/737 |
| 5,438,665 | 8/1995 | Taniai et al. | 395/845 |
| 5,455,919 | 10/1995 | Brewer | 395/681 |
| 5,487,167 | 1/1996 | Dinallo et al. | 395/650 |
| 5,493,660 | 2/1996 | DeLano et al. | 395/416 |

OTHER PUBLICATIONS

Bailes, "Memory Management and Multitasking Beyond 640K", ISBN 0–8306–3476–2, Chapter 4 1992.

*Primary Examiner*—John W. Cabeca
*Assistant Examiner*—Christopher S. Chow
*Attorney, Agent, or Firm*—James M. Stover

[57] ABSTRACT

A multischeme memory management system for large memory computer systems which combines traditional hardware based memory management with a versatile software based memory management scheme. The memory management system includes a conventional memory handler implemented in hardware for managing memory addresses below a fixed limit, for example four gigabytes; and a plurality of memory handlers implemented in software for managing memory addresses greater than four gigabytes. A programmable memory range detectors is associated with each software implemented memory handler. Memory handlers are selected by addressing the different memory address ranges programmed into the memory range detectors. The memory range detectors associated with the software implemented memory handlers are also prioritized so that lower priority memory range detectors are disabled when a higher priority memory range detector receives an address included within its memory range, thereby resolving conflicts which may otherwise occur when address ranges overlap. The range of addresses associated with the lowest priority memory range detector may be defined to include all memory addresses, thereby establishing the lowest priority memory range detector and its associated software implemented memory handler as defaults for memory addresses greater than four gigabytes.

6 Claims, 2 Drawing Sheets ize; a logical or virtual addressing system to address system
MULTISCHEME MEMORY MANAGEMENT SYSTEM FOR COMPUTER The present invention relates to a method and system for managing system memory within a computer system and, more particularly, to a system employing multiple memory management techniques for managing different memory address ranges within system memory.

BACKGROUND OF THE INVENTION

Within a microprocessor-based computer system, locations in RAM and ROM/PROM memories and, in some systems, I/O devices are allocated permanent, physical addresses which are used by the system microprocessor to access memory or I/O locations during read or write operations. However, most computer processes or programs utilize; a logical or virtual addressing system to address system memory. A logical address is an address expressed as a location relative to a beginning or base location for a process, thus a process does not require use of the same physical memory addresses each time it executes. The size of the logical address space can be smaller than, equal to, or larger than the size of the physical address space. Logical memory having an address space which can be resigned to or translated physical memory is known as virtual memory.

Most microprocessors in use today support virtual addressing and also provide the capability of developing multitasking, multiuser, and distributed processing systems. These advanced features are supported through a hardware device known as a memory management unit, abbreviated as MMU. The MMU may be included on the same integrated circuit as the rest of the microprocessor, such as in the Intel 80386, 80486 and Pentium, the Motorola 68030 and 68040, and MIPS R2000/R3000 processors, or may be in a companion chip to the microprocessor, such as the 68851 paged MMU which accompanies the Motorola 68020 processor.

Memory management units generally provide the following functionality:
  Support for dynamic memory allocation, providing for the efficient management of the physical address space;
  Support for virtual memory implementation, providing for the management of the virtual address space;
  Mapping of virtual addresses to physical addresses;
  Memory protection and task security (in some cases);
  Processing of page faults or bus fault exceptions, wherein addressed code or data not currently resident in main memory is called into memory and the associated page table is updated to allow task execution to complete; and
  Supporting sharing of code and data in main memory by multiple processes.

As indicated above, one of the primary functions of an MMU is to receive virtual addresses and map them into physical addresses. Several mapping techniques are commonly employed, such as paging, segmentation, and segmented paging.

Paging, possibly the most widely supported mapping technique, involves the partitioning of memory into equal fixed-size chunks known as frames, and the division of each process into the same size chunks known as pages. Pages are allocated to frames which are distributed throughout the memory. In order to keep track of the physical location of each memory page, the operating system maintains a page table. The page table includes a number of entries, referred to as page table entries, each of which shows the frame location for each page of a process. Each process operates with logical addresses which include a page number and relative address within the page. In order to access a memory page, the page number is used to address an entry in the page table in order to obtain the frame location.

In a virtual memory implementation, it is not necessary that an entire task be placed into main memory for execution. Generally, only a small number of pages or segments (discussed below) for a task need be resident in main memory at any moment. When the system encounters a portion of a task not resident in memory, the mapping mechanism will generate a high priority exception referred to as a page fault, bus error exception or segment-not-present exception). The operating system is responsive to this page fault to find the required page or segment in secondary storage and move the page or segment into main memory. As task execution progresses, additional pages or segments will be called into main memory as required, replacing pages or segments not currently needed, to permit the task to complete.

In a paged mapping system, the operating system must maintain a page table for each active task or process. One disadvantage of a paged mapping system is that the size of the page tables can become quite large.

When multiple processes are active, a significant amount of main memory may be occupied by page tables.

Segmentation is another way in which memory can be subdivided. In a segmented system, the programmer or compiler subdivides a task's logical address space into modules of varying sizes identified as segments, each segment being addressed by a segment number. A segment comprises a block of contiguous locations within the logical address space, which is placed in its whole into main memory when required during task execution. Segments are of large size than data pages; but like data pages, segments are located by means of a entries in a segment table, the segment table entries having data access bits associated therewith.

Because of the larger size of segments versus pages, and further because the size of segments may vary, memory fragmentation problems can occur. Fragmentation results form the swapping of segments into an out off memory creates large gaps in system memory between areas occupied by active segments, the gaps not containing enough contiguous locations to accommodate all segments which may be called into main memory.

Although paging alone, and segmentation alone, each have weaknesses, the two concepts can be combined to produce a mapping system which minimizes these weaknesses while obtaining some of the advantages of both paging and segmentation. In a segmented-paging system, a task's logical address space is divided into segments, and each segment is partitioned further into pages of equal size. Main memory is also partitioned into page frames of equal size. Utilizing this scheme, the pages of a segment placed into main memory need not occupy contiguous locations within main memory. A segmented-paging scheme requires the operating system to maintain both a segment table as well as a page table, and two levels of translations are required to compute a physical address.

It should be noted that many improvements and modifications to the mapping schemes summarized above are possible. Unique mapping schemes may be developed to produce optimal performance for specific applications or systems. Many of these mapping schemes can be implemented in software as well as in MMU hardware. It should also be noted that the MMUs incorporated into or utilized with many popular microprocessors which support virtual addressing limit the virtual and physical address space to four gigabytes. Thus a memory management system supporting virtual address spaces greater than four gigabytes, and providing optimal memory performance for differing applications is desired.

OBJECTS OF THE INVENTION

It is therefore an object of the present invention to provide a new and useful memory management system for large memory computer systems.

It is another object of the present invention to provide such a memory management system which provides multiple memory managers or handlers for different virtual address ranges identified by a user.

It is yet another object of the present invention to provide a new and useful multischeme computer memory management system combining conventional hardware based memory management with additional software based memory handlers.

SUMMARY OF THE INVENTION

There is provided, in accordance with the present invention, a multischeme memory management system for a computer systems comprising a plurality of memory handlers; and a plurality of memory range detectors, a memory range detector corresponding to each one of the plurality of memory handlers, each one of the memory range detectors being connected to receive memory addresses the computer system. Each memory range detector is responsive to a range of received addresses specific to the detector to enable the detector's corresponding memory handler; the memory handler being otherwise disabled. Thus, memory handlers are selected by addressing specified memory address ranges.

The described embodiment includes a conventional memory handler implemented in hardware for managing memory addresses below a fixed limit, for example four gigabytes; and a plurality of memory handlers implemented in software for managing memory addresses greater than four gigabytes. The memory range detectors associated with the software implemented memory handlers are programmable to be responsive to different memory ranges specified by a computer system user.

The memory range detectors associated with the software implemented memory handlers are also prioritized so that lower priority memory range detectors are disabled when a higher priority memory range detector receives an address included within its memory range, thereby resolving conflicts which may otherwise occur when address ranges overlap. The range of addresses associated with the lowest priority memory range detector may be defined to include all memory addresses, thereby establishing the lowest priority memory range detector and its associated software implemented memory handler as defaults for memory addresses above the fixed limit.

The above and other objects, features, and advantages of the present invention will become apparent from the following description and the attached drawings.

DETAILED DESCRIPTION OF THE PREFERRED EMBODIMENT

Figure 1:
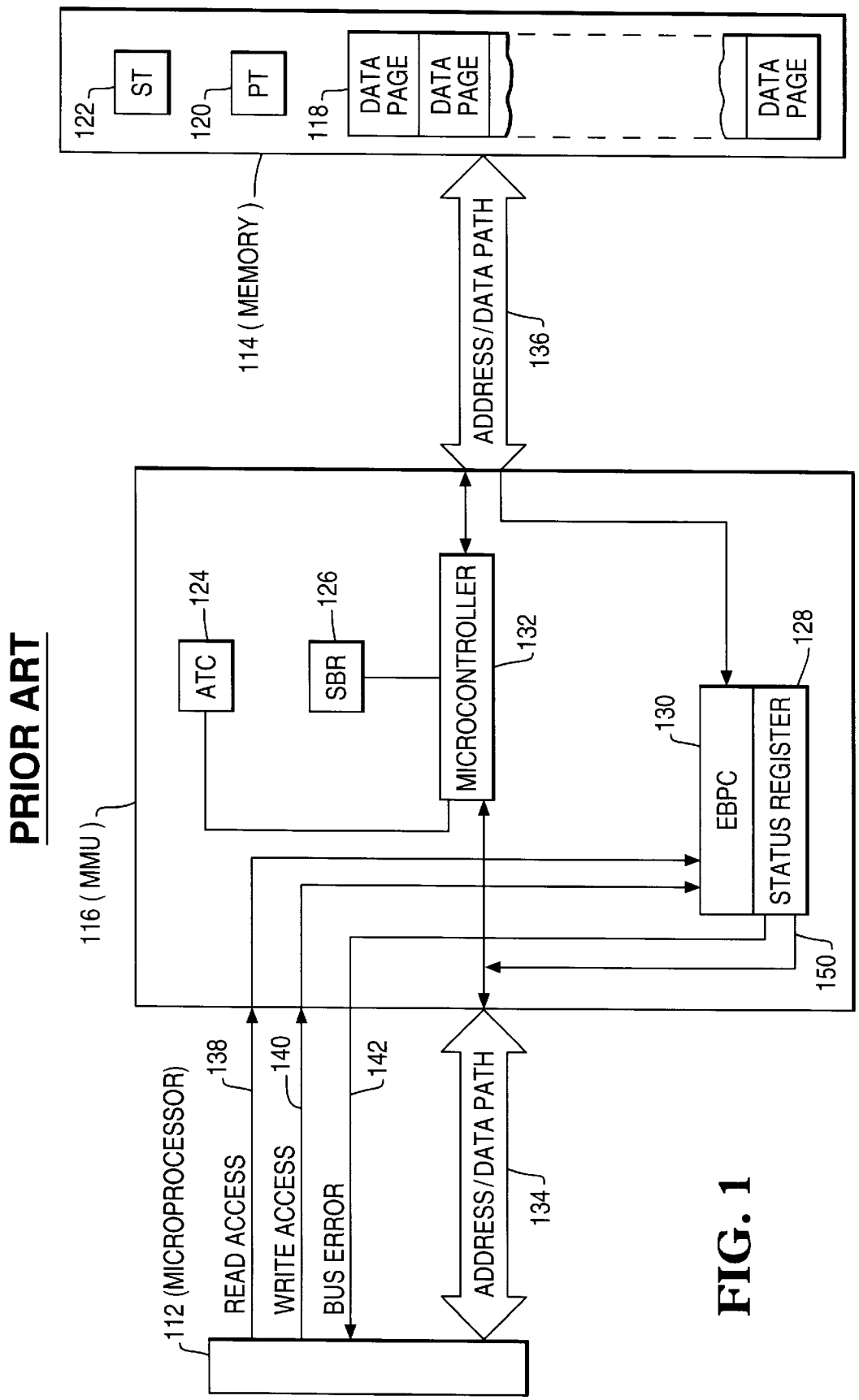
FIG. 1 is a block diagram of a conventional computer system including a separate memory management unit (MMU) for performing virtual to real address translation, as well as other virtual memory management functions.

FIG. 1 shows a block diagram of an exemplary computer system including a microprocessor 112, a main memory 114, and a memory management unit 116 connected therebetween. The computer system is part of a multiprogramming system in which the part of memory 114 allocated to users is subdivided to accommodate multiple processes. Main memory 114 is partitioned into fixed length divisions known as data pages 118. In the embodiment shown, each page consists of 4K bytes of data. The address of each page is stored in respective entries in a page table 120 which also resides in main memory 114. Additionally, memory 114 includes a segment table 122 for accommodating segmented paging memory mapping techniques.

Memory management unit 116 includes an address translation cache 124, a segment base register 126, a status register 128, an error bit processing circuit 130, and a microcontroller 132. A first address bus 134 connects memory management unit 116 to microprocessor 112, while a second address bus 136 connects memory management unit 116 to memory 114. Error bit processing circuit 130 is connected to main memory 114 through address bus 134 and receives certain hardware control bits therefrom. In addition, error bit processing circuit 130 is connected to control signal lines 138 and 140 for receiving READ ACCESS and WRITE ACCESS control signals, respectively, from microprocessor 112. Status register 128 is connected to microprocessor 112 by a control line 142 and provides a bus error signal over line 142 to microprocessor 112. Status register 128 is also connected to microprocessor 112 by bus 150 over which the microprocessor 112 may read the contents of register 128.

The exemplary system as described to this point is a conventional system employing a MMU 116 interposed between the system processor 112 and main memory 114. The construction and operation of the system and MMU 116 is well understood by those skilled in microprocessor based system technologies.

Figure 2:
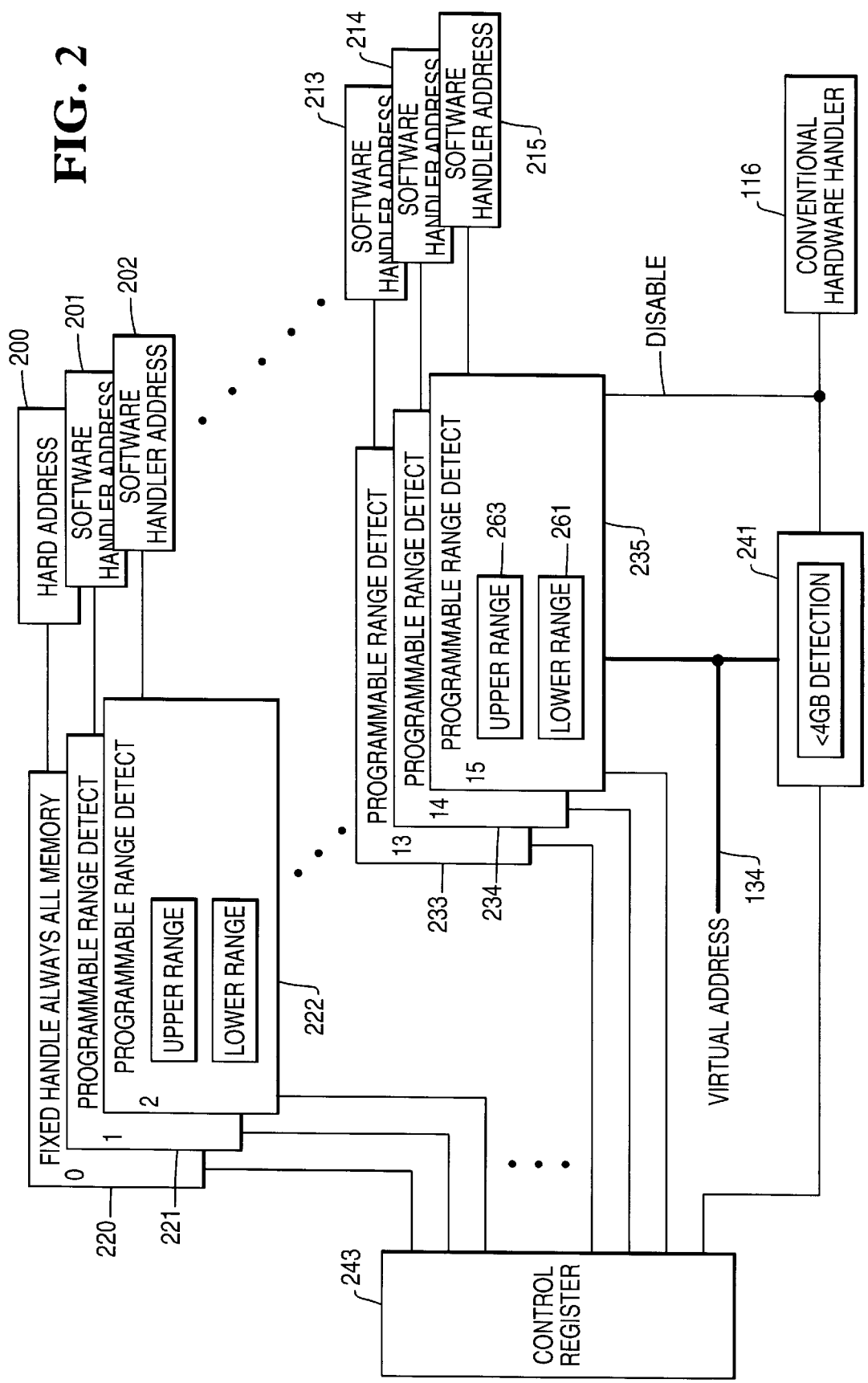
FIG. 2 is a simple block diagram of a multiple scheme memory management system in accordance with the present invention.

FIG. 2 illustrates an improvement to the memory management system employed in the computer system as described above. The logic shown in the simple block diagram of FIG. 2 includes multiple memory managers or handlers, implemented in both hardware and software, and also provides support for virtual address spaces greater than a fixed limit, for example four gigabytes. Conventional hardware MMU 116 is retained for support of virtual addresses up to four gigabytes.

The logic includes sixteen memory handlers 200 through 215, implemented in software, in addition to conventional hardware handler 116. Sixteen programmable range detectors 220 through 235, corresponding to memory handlers 200 through 215, respectively, are connected to receive virtual addresses from address bus 134.

In the embodiment shown, range detector 220 is fixed to detect all of memory, and points to a hard-coded address for memory handler 200. Detector 220 and handler 200 thereby provide a known memory manager default. The remaining range detectors 221 through 235 are programmable and prioritized. Each address detector 221 through 235 can be programmed with a user-selected lower address 261 and upper address 263 to define a range of virtual addresses which are to be handled by the detector's corresponding memory handler. The detectors are prioritized so that a higher numbered detector will disable all lower priority detectors/handlers; e.g., range detector 235 will disable all of range detectors 220 through 234, and range detector 234 will disable all of range detectors 220 through 233, etc. This method of prioritizing detectors will allow multiple detections of a single range of addresses, but will result in only one handler selection.

An additional range detector 241 is connected to address bus 134 for detection of virtual address within the conventional four gigabyte range. Conventional hardware MMU 116 is enabled, and the remaining detectors 220 through 235 and their corresponding handlers 200 through 215 are disabled, for virtual addresses within the four gigabyte range.

Conventional hardware MMU 116 and range detectors 220 through 235 are individually enabled through use of a control register 243. Fixed range detector 220 and handler 200 should always be enabled, while the remaining detectors/handlers and convention hardware MMU 116 are individually enabled through use of control register 243.

It can thus be seen that there has been provided by the present invention a new and useful multischeme memory management system for large memory computer systems, combining traditional hardware based memory management with a versatile software based memory management scheme. The invention is intended for use with large memory systems, eliminating the need for the large tables required by traditional memory managers. Unique memory handlers are associated with different virtual address ranges identified by a user. Memory handlers are selected by detecting which of several possible ranges of memory an address is included in.

Although the presently preferred embodiment of the invention has been described, it will be understood that various changes may be made within the scope of the appended claims.

What is claimed is:

1. A memory management system for a computer system, comprising:
    a plurality of memory handlers; and
    a plurality of memory range detectors, a memory range detector corresponding to each one of said plurality of memory handlers, each one of said memory range detectors being connected to receive memory addresses from said computer system;
    whereby each one of said memory range detectors is responsive to a range of received addresses specific to said one of said memory range detectors to enable the memory handler corresponding to said one of said memory range detectors, said memory handlers being otherwise disabled: and wherein:
        the range of addresses specific to more than one of said plurality of memory range detectors may overlap;
        said plurality of memory range detectors are prioritized; and
        said memory management system further comprises prioritizing logic for disabling all lower priority memory range detectors when a higher priority memory range detector receives an address included within its memory range.

2. The memory management system in accordance with claim 1, further comprising:
    a conventional memory handler implemented in hardware for managing memory addresses below a fixed limit; and
    a fixed range memory detector connected to receive memory addresses from said computer system, connected to said conventional memory handler, and connected to each one of said plurality of memory range detectors;
    whereby said fixed range memory detector is responsive to received addresses below saided limit to enable said conventional memory handler and to disable said plurality of memory range detectors.

3. The memory management system in accordance with claim 2, wherein:
    said plurality of memory handlers are implemented in software.

4. The memory management system in accordance with claim 2, wherein:
    said plurality of memory range includes a default memory range detector having a range of addresses associated therewith which includes all memory addresses, said default memory range detector having a lower priority than each one of said plurality of memory range detectors other than said default memory range detector; and
    each one of said plurality of memory range detectors other than said default memory range detector has a range of addresses associated therewith which can be selected by a computer system user.

5. The memory management system in accordance with claim 2, further comprising:
    a control register connected to each one of said plurality of memory range detectors and to said fixed range memory detector, said control register being programmable by a computer system user to selectively enable and disable said each one of said plurality of memory range detectors and to said fixed range memory detector.

6. A memory management system for a computer system, comprising:
    a plurality of memory handlers implemented in software;
    a plurality of memory range detectors, a memory range detector corresponding to each one of said plurality of memory handlers, each one of said memory range detectors being connected to receive memory addresses from said computer system;
    whereby each one of said memory range detectors is responsive to a range of received addresses specific to said one of said memory range detectors to enable the memory handler corresponding to said one of said memory range detectors, said memory handlers being otherwise disabled;
    a conventional memory handler implemented in hardware for managing memory addresses below a fixed limit; and
    a fixed range memory detector connected to receive said memory addresses from said computer system, connected to said conventional memory handler, and connected to each one of said plurality of memory range detectors;
    whereby said fixed range memory detector is responsive to received addresses below said fixed limit to enable said conventional memory handler and to disable said plurality of memory range detectors; and wherein:
        the range of addresses specific to more than one of said memory range detectors may overlap;
        said plurality of memory range detectors are prioritized; and
        said memory management system further comprises prioritizing logic for disabling all lower priority memory range detectors when a higher priority memory range detector receives an address included within its memory range.

* * * * *